(12) United States Patent
Zimmermann et al.

(10) Patent No.: US 6,618,776 B1
(45) Date of Patent: Sep. 9, 2003

(54) USB BANDWIDTH MONITOR

(75) Inventors: Remy Zimmermann, Belmont, CA (US); Patrick Miauton, E. Palo Alto, CA (US)

(73) Assignee: Logitech Europe, S.A., Romanel-sur-Morges (CH)

( * ) Notice: Subject to any disclaimer, the term of this patent is extended or adjusted under 35 U.S.C. 154(b) by 0 days.

(21) Appl. No.: 10/222,185

(22) Filed: Aug. 15, 2002

(51) Int. Cl.[7] .............................. G06F 13/00; H04J 3/17
(52) U.S. Cl. .......................... 710/117; 710/63; 375/240
(58) Field of Search .......................... 710/117, 63, 107, 710/72, 307; 709/219, 235, 231, 223, 224, 226; 375/240; 370/468, 462, 230

(56) References Cited

U.S. PATENT DOCUMENTS

| | | | |
|---|---|---|---|
| 4,348,586 A | | 9/1982 | Kokorowski |
| 4,373,183 A | * | 2/1983 | Means et al. |
| 4,819,230 A | * | 4/1989 | Calvignac et al. |
| 5,353,282 A | * | 10/1994 | Dormer et al. |
| 5,479,447 A | | 12/1995 | Chow et al. |
| 5,592,470 A | | 1/1997 | Rudrapatna et al. |
| 5,611,038 A | | 3/1997 | Shaw et al. |
| 5,815,492 A | | 9/1998 | Berthaud et al. |
| 5,848,266 A | | 12/1998 | Scheurich |
| 5,912,894 A | | 6/1999 | Duault et al. |
| 5,978,387 A | | 11/1999 | Sherman |
| 6,014,694 A | | 1/2000 | Aharoni et al. |
| 6,101,550 A | | 8/2000 | Zucker |
| 6,104,392 A | | 8/2000 | Shaw et al. |
| 6,108,306 A | * | 8/2000 | Kalkunte et al. |
| 6,118,791 A | | 9/2000 | Fichou et al. |
| 6,240,066 B1 | | 5/2001 | Nagarajan et al. |
| 6,243,761 B1 | | 6/2001 | Mogul et al. |
| 6,266,345 B1 | | 7/2001 | Huang |
| 6,307,974 B1 | | 10/2001 | Tsujimoto |
| 6,327,254 B1 | | 12/2001 | Chuah |
| 6,356,945 B1 | | 3/2002 | Shaw et al. |
| 6,499,072 B1 | * | 12/2002 | Frank et al. |

* cited by examiner

*Primary Examiner*—Gopal C. Ray
(74) *Attorney, Agent, or Firm*—Townsend and Townsend and Crew LLP

(57) ABSTRACT

An apparatus and method for intercepting messages between the bus controller and a device attempting to connect over the bus. Based on the intercepted message, the existing device using bandwidth can determine whether it can relinquish some of its bandwidth allocation while maintaining sufficient transmission quality. Thus, the already connected devices will make the determination if they can relinquish bandwidth, to allow a new device to connect.

14 Claims, 2 Drawing Sheets

USB BANDWIDTH MONITOR

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

The present invention relates to varying the bandwidth used on a shared bus, such as the Universal Serial Bus (USB).

The need to vary the bandwidth used by a device arises in many situations. Some devices may be capable of connecting to different types of transmission lines, and need to adapt their bandwidth to the available bandwidth of the particular transmission media. Transmissions over the Internet may have varying bandwidth depending upon a particular route assigned for particular transmission. U.S. Pat. No. 6,014,694 shows adapting the compression ratio of video to accommodate varying bandwidths over the Internet.

A number of buses could benefit from varying the bandwidth used, such as 1494, Bluetooth, and 802.11.

With respect to a shared bus, such as the USB, the amount of bandwidth used by one device may limit the amount of bandwidth available to another device. A USB controller will allocate bandwidths to the different devices. U.S. Pat. No. 6,101,550 illustrates one type of USB controller.

When a particular device on the USB is allocated a bandwidth less than is optimum, the device can make adjustments to work with the bandwidth assigned. For example, U.S. Pat. No. 5,848,266 illustrates varying the sampling rate to adjust to the bandwidth allocated on a USB, in particular for bulk transfer mode.

The present version of the USB allows up to 127 devices to connect to a computer via the bus. The bus has a maximum data rate of 12 megabits/second. Any individual device can request more than half of this maximum. The bandwidth is divided into frames which are controlled by the bus controller in the host. Four different types of data transfer are supported:

(1) Interrupt. This is used by devices which send very little data, such as a mouse or keyboard.
(2) Bulk. This transfers a 1-time block of data, and is used by devices such as printers.
(3) Isochronous. This is used by streaming devices which send a constant datastream, such as video or audio.
(4) Control. This is used to control the device, and is normally used for small data transfers.

Isochronous and interrupt type transfers have bandwidth reserved and available at interface configuration time. Bulk and control transfers use bandwidth based on the actual bandwidth available at the time of transfer.

When too many devices want to use the USB, the last device to attempt to obtain bandwidth may be blocked from using the bus. The bus controller then must either not allocate any bandwidth, or must allocate less bandwidth to other devices. If too little is allocated, another device may not be able to use the bandwidth at all, or may suffer noticeable degradation of quality. It would be desirable to have a method for varying the bandwidth with minimal degradation of quality. It would also be desirable to have a method which allows the devices themselves to determine how much bandwidth they can live with, and be able to work with existing bus controllers.

BRIEF SUMMARY OF THE INVENTION

The present invention provides an apparatus and method for intercepting messages between the bus controller and a device attempting to connect over the bus. Based on the intercepted message, the existing device using bandwidth can determine whether it can relinquish some of its bandwidth allocation while maintaining sufficient transmission quality. Thus, the already connected devices will make the determination if they can relinquish bandwidth, to allow a new device to connect.

The device giving up bandwidth can decrease usage step by step in a reiterative polling process, so that it doesn't have to give up more than is needed. Each device will know its minimum bandwidth requirement and the possible tradeoffs it can make, such as in quality, resolution and frame rate.

In one embodiment, for a USB bus, a filter driver is used to intercept an Allocation Failure Event (AFE) sent from the bus controller to a new device rejecting its request for bandwidth. The filter allows the connected device to determine whether it can relinquish bandwidth while still maintaining sufficient quality of transmission. The AFE notification may be set up to be intercepted only for a designated class of devices, such as for streaming devices. In other words, bandwidth requests for interrupt or bulk mode would not be intercepted, while those for isochronous would be intercepted.

In one embodiment, the USB bandwidth monitor of the present invention can work with an existing USB controller, without requiring the replacement of the controller. For a further understanding of the nature and advantages of the invention, reference should be made to the following description taken in conjunction with the accompanying drawings.

DETAILED DESCRIPTION OF THE INVENTION

Figure 1:
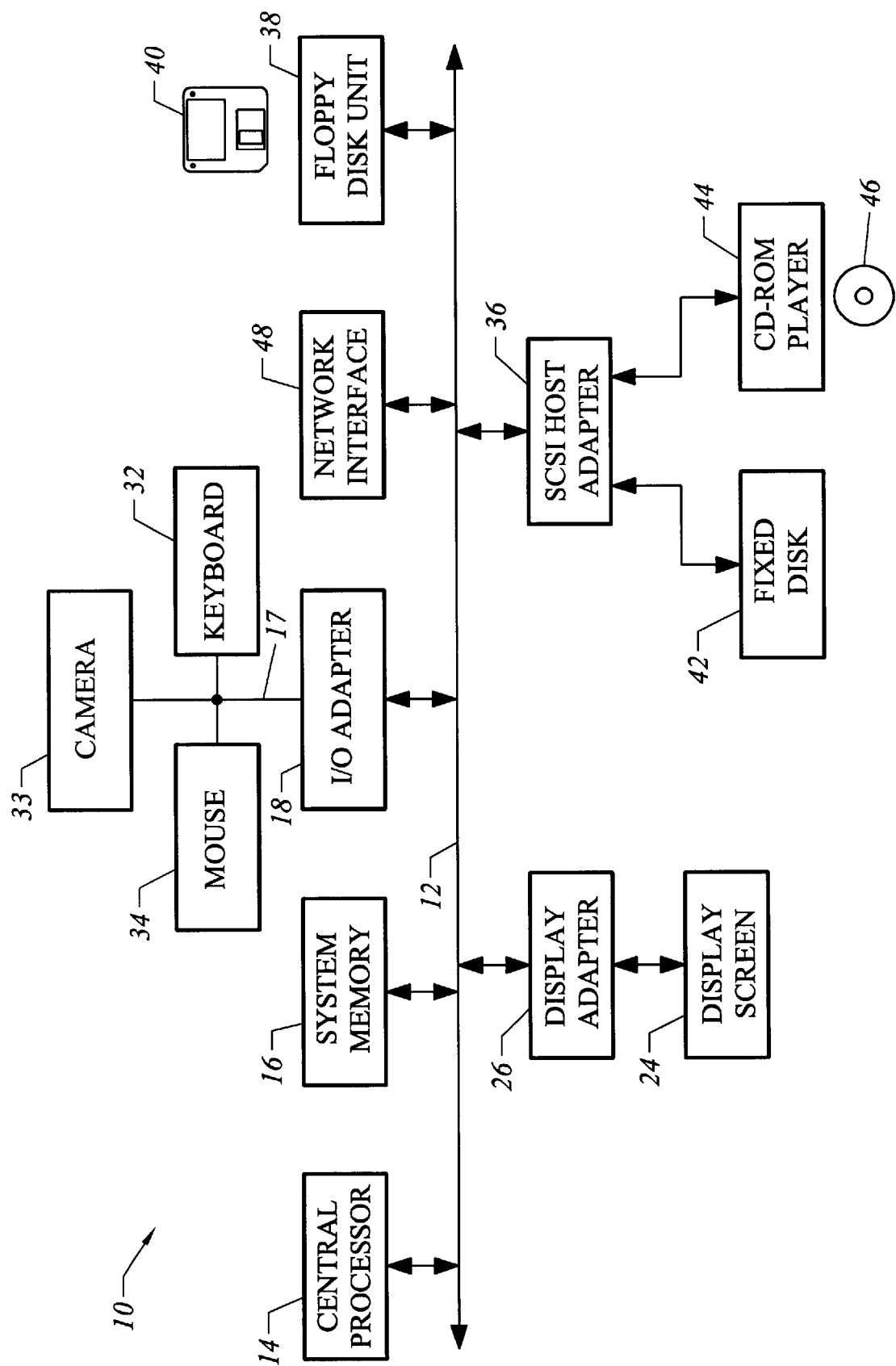
FIG. 1 is a block diagram of a computer system in which the present invention will operate.

First, a description is presented of a typical computer configuration on which the software of the present invention will run in one embodiment. FIG. 1 depicts a block diagram of a host computer system 10 suitable for implementing the present invention. Host computer system 10 includes a bus 12 which interconnects major subsystems such as a central processor 14, a system memory 16 (typically RAM), an input/output (I/O) adapter 18, an external device such as a display screen 24 via display adapter 26, a keyboard 32, camera 33 and mouse 34 via USB 17 and I/O adapter 18, a SCSI host adapter 36, and a floppy disk drive 38 operative to receive a floppy disk 40. SCSI host adapter 36 may act as a storage interface to a fixed disk drive 42 or a CD-ROM player 44 operative to receive a CD-ROM 46. Fixed disk 44 may be a part of host computer system 10 or may be separate and accessed through other interface systems. A network interface 48 may provide a direct connection to a remote server via a telephone link or to the Internet via a POP (point of presence). Many other devices or subsystems (not shown) may be connected in a similar manner.

Also, it is not necessary for all of the devices shown in FIG. 1 to be present to practice the present invention. The devices and subsystems may be interconnected in different ways from that shown in FIG. 1. The operation of a computer system such as that shown in FIG. 1 is readily known in the art and is not discussed in detail in this application. Code to implement the present invention may be operably disposed or stored in computer-readable storage media such as system memory 16, fixed disk 42, CD-ROM 46, or floppy disk 40.

Keyboard 32, camera 33 and mouse 34 are just examples of three devices which can connect over USB 17 to the host via the I/O adapter 18. The software for the USB controller and for the USB bandwidth monitor of the invention would typically be stored in system memory 16 when the computer is running.

Figure 2:
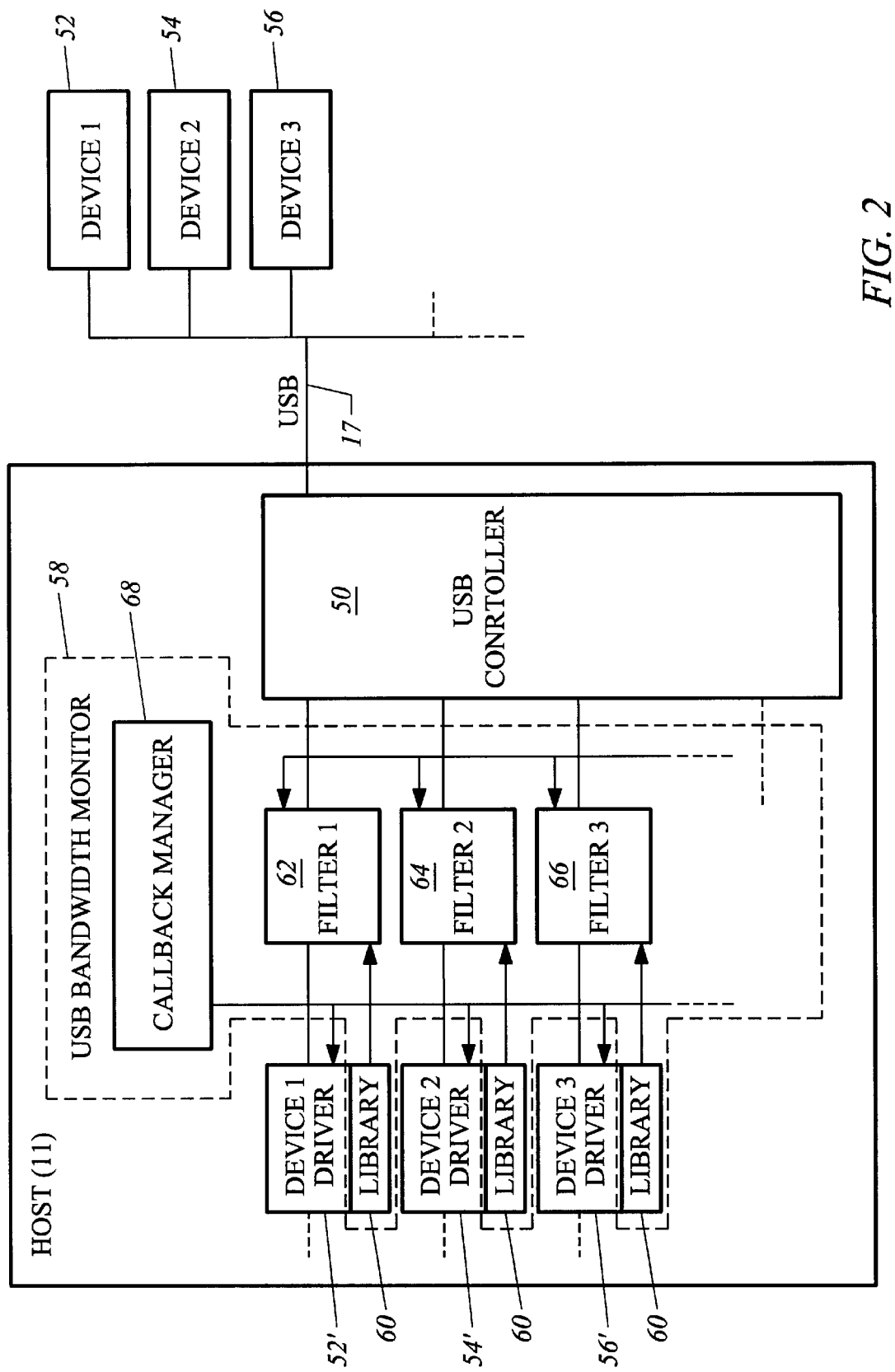
FIG. 2 is a block diagram illustrating the USB and the software modules of an embodiment of the present invention.

FIG. 2 illustrates the software modules in an embodiment of the invention. USB 17 is connected to a host computer 11. Host computer 11 includes a USB controller 50. It also includes software device drivers 52', 54' and 56', corresponding to physical devices 52, 54 and 56 on USB 17. The present invention adds the USB bandwidth monitor in the form of a software module 58.

Bandwidth monitor 58 includes a library of commands 60 used by the software. In addition, a filter is copied, or instantiated, multiple times to provide a separate filter for each of the device drivers. These are filters 62, 64 and 66, which intercept communications to device drivers 52', 54' and 56', respectively. The filters intercept the bandwidth allocation/de-allocation requests and notify the callback manager module 68 for the bus every time an allocation/de-allocation fails or succeeds. The callback manager essentially polls the different device drivers to determine which one can give up bandwidth to allow a new device to connect where there has been a failure to connect a new device due to insufficient bandwidth. The polling can take multiple rounds, with each device giving up a minimal amount originally, in the hope that other devices will make up the necessary amount of bandwidth.

Depending on the event the call back manager module receives, it will transmit the information to the device drivers using the corresponding callback functions, if available. The call back functions are implemented in the device driver and are responsible for the re-allocation scheme. The library 60 is used by the device driver to connect to the filter and register/de-register its call back functions.

The goal of the USB bandwidth monitor is to allow for a better cohabitation between USB streaming devices and other USB devices. Since streaming devices use a lot of bandwidth, and usually use as much bandwidth as available to insure the best possible quality of the streams, it is not rare to have other USB devices such as USB speakers, USB headsets, and other USB sound devices in particular, fail to initialize because not enough USB bandwidth is available to them when a streaming device has been initialized before them. This seriously degrades the user experience.

The USB bandwidth monitor is an attempt to eliminate or at least minimize the occurrences of this type of behavior by creating a mechanism that warns select devices when a USB bandwidth allocation request has failed but before the requestor has been notified of the failure. This gives a chance to these devices to minimize their bandwidth allocation so that the failed request can be retried with a higher chance of success. In order to make the mechanism more efficient select devices can also be informed when a bandwidth allocation change has successfully been made and/or when a request that had initially failed is returned to the requestor.

Basically, this invention allows USB streaming devices to optimally use the USB bandwidth while minimizing interferences with other USB devices, thus improving the user experience.

Devices using the USB Bandwidth Monitor (BWM) to manage their bandwidth will be called Smart devices herein.

The BWM only monitors USB devices belonging to select device classes (for example: Media devices, Imaging devices etc.). Smart devices must belong to one of the monitored classes to be able to use the BWM.

When a Smart device loads, it registers with the BWM. This registration tells the BWM which events the Smart device wants to know about. In one embodiment, there are three kinds of events: Allocation Failure Events (AFE), Allocation Success Notification Events (ASNE) and Allocation that originally Failed now Complete Notification Events (AFCNE). Notice that there are two families of events: 'normal' events and notification events. There is a major difference between these two families. This difference will be explained later. If the BWM is not installed in the system on which the Smart device is loading, or if the Smart device does not belong to a monitored device class, then the registration will fail and the Smart device will behave like a normal device. This way the BWM becomes fully modular and Smart devices can work on systems whether or not the BWM is installed. After this registration attempt the Smart device continues its initialization like any other USB device would do.

When other monitored devices (Smart or normal) try to allocate or free bandwidth on the USB bus, the BWM sees it. It lets the request pass through, but intercepts the request after it has been completed by the USB bus controller. It then looks at the results of the request. Based on the results it will callback the various registered Smart devices to notify these that an event for which they have registered has happened. This is where the two families of events come into play:

Notification events are usually triggered after the request that triggered the notification event has been returned to the requestor. This means that the only thing that the event can do is notify (hence the name: Notification event) because there is nothing that can be done to change the outcome of the request now that the request has been returned. In reality, the BWM can (if enabled) decide to send some notification events synchronously (i.e.: before returning the request to the requestor). However, a Smart device receiving a notification event can make no assumption regarding whether the notification event has been sent asynchronously or not.

'Normal' events, on the other hand, are triggered while the request that triggered the event is being kept on hold in the BWM. This means that the device being notified can influence how the request will complete. For example, devices registered to these events could change their bandwidth allocation and ask for the request to be retried.

AFE events will be triggered when a bandwidth allocation request has failed. In this case the request will be put on hold. The BWM callback manager 68 will start the first round of callbacks by calling the first Smart device that has registered for AFE. The Smart device can make some modifications to its bandwidth consumption based on the information passed with the event, and/or take any other actions it sees appropriate. Then the Smart device lets the BWM know what to do. This includes:

Retry the request. Smart devices typically use this after they have made some more room on the USB bus.

Retry the request and don't call me again. Smart devices typically use this after they have relinquished all the bandwidth they can free. Which means they know they cannot do any better without affecting their own operation beyond what they consider acceptable. By giving this instruction to the BWM, the BWM will retry the request but will not include this Smart device in future rounds of callbacks for this request.

Don't call me again. This is the same as the Retry the request and don't call me again case but in this case the BWM does not retry the request and directly goes to the next Smart device to callback. Typically Smart devices that do not want or cannot help at this time use this.

Fail. This is very rarely used. This aborts the mechanism and causes the request to be returned to the requestor in its current state.

The BWM will act as told by the Smart device. If the request still fails, it will continue on by call calling the next Smart device that has registered for AFE. It does so until the request either succeeds or all Smart devices having registered for AFE have been called. If all registered Smart devices have been called, it will start the next round of callbacks to registered Smart devices. In this round all registered devices will be called except for those that indicated in a previous round that they did not want to be called again for this request. This process continues on until the request succeeds, or no more registered Smart devices want to participate in the bandwidth negotiation rounds or the maximum number of rounds (e.g., five) is reached. When the process ends, the request is returned as is to the requestor (whether it succeeded or not). This process allows devices to free bandwidth little by little. This provides a more uniform distribution of the bandwidth amongst registered devices.

ASNE notification events are triggered when a bandwidth allocation request succeeds the first time it goes through. When this happens, the request is returned to the requestor and all Smart devices having registered to ASNE are called once. This is useful for devices that made room earlier for another device that is now gone. The information attached to an ASNE includes the currently available bandwidth, which gives a good hint about how much bandwidth can be reclaimed.

AFCNE notification events are triggered when a bandwidth allocation request that originally failed is now complete, whether or not it succeeded. This always follows one or multiple round(s) of AFE for this request. When this happens, the request is usually first returned to the requestor and all Smart devices having registered to AFCNE and that participated in the round(s) of AFE that occurred for this request are called once. This is useful for devices that may have made more room available than necessary during the preceding round(s) of AFE. This gives them a chance to reclaim some of the bandwidth they freed. In some cases, it is possible (if enabled) for the BWM to send this event synchronously (i.e.: before returning the request to the requester). The Smart device receiving this event can however make no assumption regarding whether this event was sent synchronously or not.

There are a couple of exceptions to this mechanism:

A Smart device will never receive an event that was triggered by its own actions (e.g.: a Smart device will not receive an AFE if its own allocation failed. However other Smart devices will).

AFCNE events are not generated when the device that triggered the preceding AFE round(s) for a request, is a Smart device. This is to prevent endless oscillations.

Also, when any event is triggered by the actions of a Smart device, this event is marked as such. This lets the Smart devices receiving the event make assumptions on the 'smart' behavior the triggering device will have.

Before unloading, a Smart device de-registers itself from the BWM. This signifies to the BWM that this device has now left the negotiation table.

To achieve the above-described functionality, the BWM must be inserted in the path of the bandwidth allocation requests for all the USB devices in the monitored device classes. Also all Smart devices must establish a connection with the BWM.

Consequently, the BWM in one embodiment is implemented as a Windows Driver Module (WDM) class lower filter driver (a filter of I/O requests): LVUSBSta.sys. This filter is then installed in select classes only.

To enable Smart devices to easily communicate with the BWM, a library has been created: LVUSBSta.lib. This library exposes all the necessary functions that a Smart device needs.

The LVUSBSta.sys driver contains the filter itself and the callback manager. The filter is instantiated once for each USB device that needs to be monitored. The callback manager on the other hand is only instantiated once per USB bus on which there are monitored USB devices. The role of the callback manager is to keep all of the information pertaining to the registered callbacks. When the filter identifies a condition that might necessitate a callback to some Smart device(s), it asks the callback manager associated with the USB bus on which the device that the filter is monitoring is, to locate the appropriate callbacks and execute them.

Thus, in summary, devices can give up bandwidth based on the total bandwidth available and the current bandwidth usage, or by "trial and error" by decreasing usage step by step. Each device driver knows what its target should be. A lower limit under which the quality is not acceptable is set in the device driver. For video devices, the range of compression can be quite significant (factor of 2) with some reasonable quality. For example, on USB, the number of bytes per millisecond (a USB frame), there is a maximum of 1500 bytes. A typical video device with one isochronous pipe can use up to 1024 bytes/milliseconds. Typical devices today don't use this maximum to avoid problems with USB microphones on the camera (this is another advantage of this invention as the device could allocate the full bandwidth for the best quality and wait for other devices to request bandwidth). Video devices can reduce their bandwidth requirements by varying not only the quality but also the frame rate, or use a lower resolution and upscale the images in software (with no change in output resolution).

As will be understood by those with skill in the art, the present invention may be embodied in other specific forms without departing from the essential characteristics thereof. For example, the invention could be applied to any shared bus, not just the USB. Alternately, the mechanism of the invention could be partially or totally inserted into the bus controller itself, or into software or hardware on the devices themselves. A priority list of which devices are most likely to be able to give up bandwidth without quality degradation could be maintained, to prioritize the callback sequence. Accordingly, the above description is intended to be illustrative, but not limiting, of the scope of the invention which is set forth in the following claims.

What is claimed is:

1. A method for varying the allocated bandwidth of a first device on a shared bus, comprising:

receiving notification of a request for a bandwidth allocation by a second device on said shared bus;

determining if said shared bus has sufficient unused bandwidth to accommodate said request;

if there is insufficient unused bandwidth to accommodate said request, then determining if said first device can reduce its bandwidth allocation while still maintaining transmission quality above a predefined minimum level; and if said first device can reduce its bandwidth allocation while still maintaining said transmission quality above said predefined minimum level, then reducing the allocated bandwidth of said first device.

2. The method of claim 1 wherein said first device is a streaming device.

3. The method of claim 1 further comprising:

monitoring only devices of specified classes of devices for requests for bandwidth allocation.

4. The method of claim 1 further comprising:

responding to requests for bandwidth allocation with a bus controller response; and intercepting said bus controller response with a bandwidth monitor, and sending a message to said first device so that said first device can perform said step of determining if said first device can reduce its bandwidth allocation.

5. The method of claim 1 wherein said steps are performed by a filter driver.

6. The method of claim 1 wherein said shared bus is a universal serial bus.

7. The method of claim 6 wherein said bandwidth is isochronous bandwidth.

8. A method for varying the allocated bandwidth of a first streaming device on a shared bus, comprising:

monitoring only devices of specified classes of devices for requests for isochronous bandwidth allocation;

receiving notification of a request for a bandwidth allocation by a second device on said bus;

determining if said shared bus has sufficient unused bandwidth to accommodate said request;

if there is insufficient unused bandwidth to accommodate said request, then determining if said first device can reduce its bandwidth allocation while still maintaining transmission quality above a predefined minimum level; and if said first device can reduce its bandwidth allocation while still maintaining said transmission quality above said predefined minimum level, then reducing the allocated bandwidth of said first device.

9. A computer program product comprising a computer usable medium having computer readable code embodied therein for varying the allocated bandwidth of a first device on a shared bus, the computer program product comprising:

computer readable code embodied on said medium for receiving notification of a request for a bandwidth allocation by a second device on said shared bus;

computer readable code embodied on said medium determining if said shared bus has sufficient unused bandwidth to accommodate said request;

computer readable code embodied on said medium for, if there is insufficient unused bandwidth to accommodate said request, then determining if said first device can reduce its bandwidth allocation while still maintaining transmission quality above a predefined minimum level; and computer readable code embodied on said medium for, if said first device can reduce its bandwidth allocation while still maintaining said transmission quality above said predefined minimum level, then reducing the allocated bandwidth of said first device.

10. The computer program product of claim 9 further comprising:

computer readable code embodied on said medium for monitoring only devices of specified classes of devices for requests for bandwidth allocation.

11. The computer program product of claim 9 further comprising:

computer readable code embodied on said medium for responding to requests for bandwidth allocation with a bus controller response; and computer readable code embodied on said medium for intercepting said bus controller response with a bandwidth monitor, and sending a message to said first device so that said first device can perform said step of determining if said first device can reduce its bandwidth allocation.

12. The method of claim 9 wherein said bandwidth is isochronous bandwidth on a universal serial bus.

13. The method of claim 9 wherein said code comprises a filter driver.

14. An apparatus for varying the allocated bandwidth of a first device on a shared bus, comprising:

means for receiving notification of a request for a bandwidth allocation by a second device on said shared bus;

means for determining if said shared bus has sufficient unused bandwidth to accommodate said request;

means for, if there is insufficient unused bandwidth to accommodate said request, then determining if said first device can reduce its bandwidth allocation while still maintaining transmission quality above a predefined minimum level; and means for, if said first device can reduce its bandwidth allocation while still maintaining said transmission quality above said predefined minimum level, then reducing the allocated bandwidth of said first device.

* * * * *